United States Patent [19]

Hara et al.

[11] Patent Number: 4,506,752

[45] Date of Patent: Mar. 26, 1985

[54] AUTOMATIC RUNNING CONTROL METHOD FOR A VEHICLE

[75] Inventors: Kiyoshi Hara, Obu; Yozo Inoue; Munetaka Noda, both of Chiryu, all of Japan

[73] Assignee: Nippondenso Co., Ltd., Kariya, Japan

[21] Appl. No.: 430,607

[22] Filed: Sep. 30, 1982

[30] Foreign Application Priority Data

Oct. 27, 1981 [JP] Japan .................. 56-171615

[51] Int. Cl.³ .............................................. B60K 31/00
[52] U.S. Cl. ...................................... 180/179; 74/866
[58] Field of Search .............. 74/866, 859, 864, 865; 192/3 R; 180/179, 178

[56] References Cited

U.S. PATENT DOCUMENTS

3,709,068  1/1973  Mohri ..................................... 74/866
3,937,105  2/1976  Arai et al. ............................. 74/866
4,027,554  6/1977  Ito et al. ................................ 74/866
4,325,336  4/1982  Kuno et al. ...................... 180/179 X Primary Examiner—Joseph F. Peters, Jr.
Assistant Examiner—Michael Mar
Attorney, Agent, or Firm—Cushman, Darby & Cushman

[57] ABSTRACT

A running control system for vehicles includes a control unit, a plurality of control switches for selecting various operations, a throttle actuator, and an automatic transmission having a lock-up clutch solenoid. An automatic cruise control operation and transmission control operation is performed by the output control signals from the control unit through the throttle actuator, the lock-up clutch, and the solenoids in accordance with the set conditions of the control switches and detected signals from a vehicle speed sensor and a throttle valve sensor. With this construction, when the vehicle speed is above a predetermined value and automatic cruising is instructed, the lock-up clutch is compulsorily operated and this locked up condition of the clutch is maintained during the automatic cruising condition, thus enabling improved fuel comsumption as well as power transmission efficiency.

3 Claims, 17 Drawing Figures

AUTOMATIC RUNNING CONTROL METHOD FOR A VEHICLE

BACKGROUND OF THE INVENTION

1. Field of the Invention

The present invention relates to an automatic running control system for vehicles, particularly to a running control system for a car having an automatic transmission and an automatic cruising control in which transmission control and automatic cruising control can be integrally carried out, while a locked clutch is compusorily operated when the automatic cruising is instructed during a predetermined level of car speed, for instance, more than 60 km/h (37.3 mile/h) and the locked up condition of an automatic transmission is maintained.

2. Description of the Prior Art

Generally, in a car with an automatic transmission function and an automatic cruising function, it is constructed in such a manner that one control unit for gear transmission control and another control unit for automatic cruising control are provided in order to independently perform the gear transmission control and the automatic cruising control. In this case, while a predetermined lock-up pattern is prepared in advance for the transmission control unit as lock-up arises, a decision is made as to whether or not the lock-up clutch, i.e. the clutch for mechanically coupling the input shaft to the output shaft of a torque converter, should be operated.

In this case, as a close relationship exists between the lock-up function and the automatic cruising function described above, the maintaining of the lock-up condition during, for instance, the automatic cruising, enables the power transmission efficiency to improve and this, in turn, enables also the fuel consumption to improve. Moreover, in this case when performing the automatic cruise control in the lock-up condition, it is also possible to improve the response thereof and to carry out an accurate vehicle speed control, while a sufficient and preferable engine brake is obtainable at a descending slope.

SUMMARY OF THE INVENTION

It is therefore a feature of the present invention to provide a running control system for vehicles in which a preferable running of a car is realized by the combination of the automatic cruise control function and the lock-up function.

It is another feature of the present invention to provide a running control system for vehicles in which when the car speed is above a predetermined level and an autodrive running is instructed, a lock-up clutch is compusorily locked up and this locked up condition is maintained during the automatic cruise condition.

It is still another feature of the present invention to provide a running control system for vehicles in which a highly accurate car speed control can be realized with a improved response.

It is still another feature of the present invention to provide a running control system in which the automatic transmission control is performed in accordance with predetermined shift patterns and lock-up patterns while the decision making is performed as to whether or not the lock-up clutch should be operated.

These and other features and advantages of the present invention will become obvious from the detailed description of a presently preferred embodiment of the invention in conjunction with the accompanying drawings.

According to one of the features of the present invention, a running control system having a throttle actuator for controlling an engine throttle valve, a torque converter having input and output shafts, is characterized in that the running control system comprises a control unit having a microcomputer for controlling various running conditions of the vehicle, input means in the control unit including a plurality of control switches for selecting various operating conditions of the vehicle, a speed sensor for detecting the vehicle speed, and a throttle sensor for detecting the opening of the throttle valve, and output means in the control unit including the throttle actuator and the speed change gear means, the output means further including lock-up clutch means coupled to said torque converter for either coupling the input and output shafts thereof or releasing the coupling between them in accordance with a first control signal from said control unit, and first and second solenoids connected to the speed change gear means and for controlling the energization and deenergization of the first and second solenoids in accordance with a second control signal from the control unit.

DETAILED DESCRIPTION OF THE PREFERRED EMBODIMENT

Figure 1:
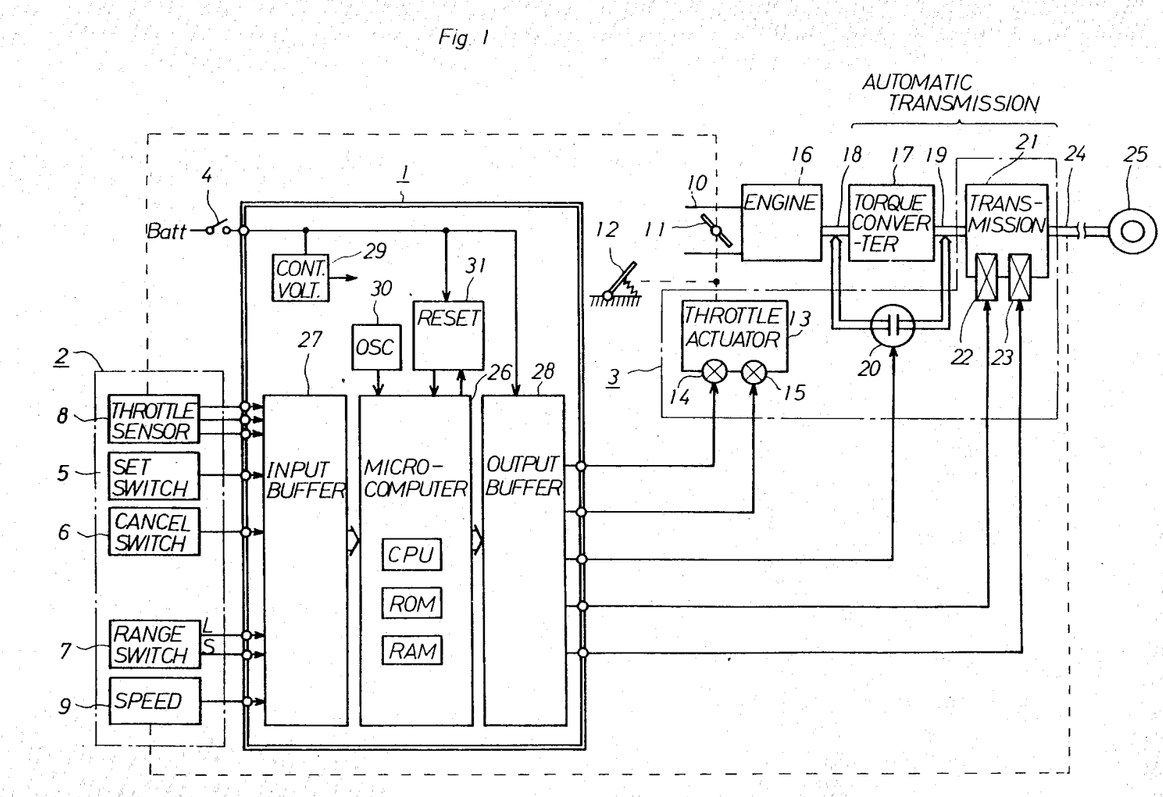
FIG. 1 is an over-all construction of the running control system according to the present invention.

Referring to FIG. 1, an over-all running control system for an automotive vehicle is shown which includes the control unit 1. The running control system also comprises an input portion 2 and an output portion 3. In addition, there are provided a key switch 4, a set switch 5 which is operable by a driver when the automatic cruising is desired, a cancel switch 6 operable by the driver when releasing the automatic cruising, a range switch 7 operable by the driver when selecting the range position including the range positions L (Low) and S (Second), a throttle sensor 8 for detecting the opening degree of a throttle valve 11 in which the opening of the throttle valve 11 can be classified into eight steps by the combination of three codes.

A vehicle speed sensor 9 is mounted at the output shaft of a transmission 21, which produces pulses corresponding to the car speed, the frequency of which is proportional to the vehicle speed. There are also provided a carburetor 10, a throttle valve 11, and accelerator pedal 12, and a throttle actuator 13 which controls the throttle valve 11 during the automatic cruising. An electromagnetic control valve 14 adjusts air pressure in a diaphragm chamber in accordance with a driver signal from the control unit 1 and also adjusts the stroke of the throttle actuator 13. An electromagnetic release valve 15 is opened and closed in accordance with a drive signal and allows the throttle valve 11 to be adjusted by the throttle actuator 13 by maintaining the closed condition during the automatic cruising. Moreover, the throttle actuator 13 is operated within the range of duty cycle of 3/16 to 13/16 of the drive signal of the control valve.

The reference numeral 16 indicates an engine, 17 indicates a torque converter, having an input shaft and an output shaft 19, and 20 indicates a lock-up clutch which couples the input shaft 18 and the output shaft 19 of the torque converter in accordance with a lock-up drive signal from the control unit 1 or releases the coupling thereof. Numeral 21 indicates the transmission, 22 and 23 indicate a first and a second solenoid, respectively which allow the gear shift positions of the speed chage gear 21 to be selected any of the first speed, the second, the third, and the fourth speed or the overdrive (O/D) by the four combinations of ON and OFF signals of a first shift solenoid drive signal and a second shift solenoid drive signal, numeral 24 indicates the output shaft of the transmission 21 and numeral 25 indicates wheels of the automotive vehicle. The torque converter 17, the lock-up clutch 20, the transmission 21 and the solenoids 22 and 23 constitute an automatic transmission.

On the other hand, the control unit 1 comprises a microcomputer 26 which integrally control the automatic cruise control function and the transmission control function in accordance with input signals from the input portion 26, an input buffer 27, an crystal oscillator 30, and a reset circuit 31, respectively. The microcomputer includes CPU, RAM and ROM.

The operation of the control unit 1 is as follows.

Figure 2:
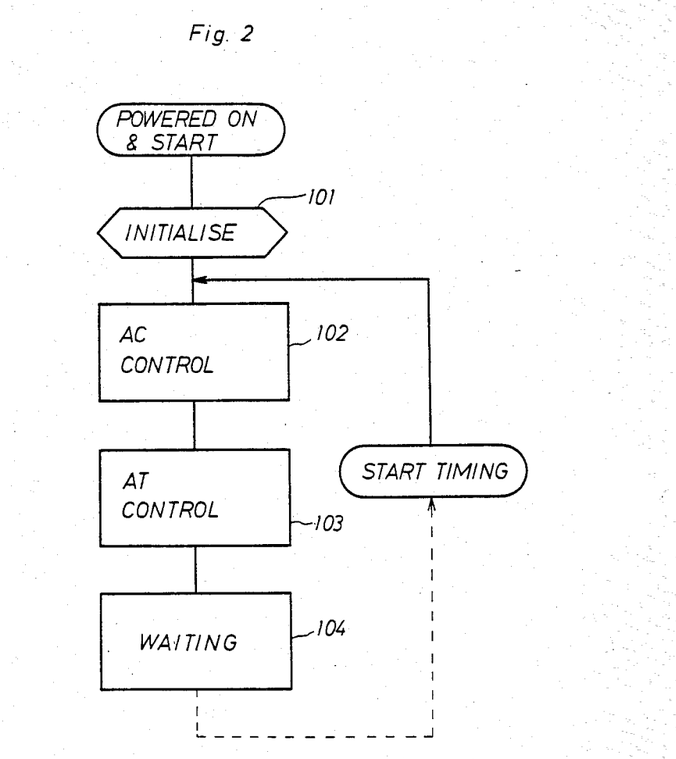
FIG. 2 is a flow chart of a main routine for controlling the operations performed by the running control system according to the present invention.

When the key switch 4 is operated, a constant voltage from the constant voltage circuit 29 is applied to the microcomputer 26 while the reset circuit 31 is set to start processing and a sequence of the operations as indicated in FIG. 2 is executed repeatedly, in synchronization with clock signals from the crystal oscillator 30.

Now, the basic processing operation of each step in a main routine in FIG. 2 is described with reference thereto. In FIG. 2, the step 101 indicates the step for performing an initial set of the contents of different registers in the CPU and the RAM (a random access memory). In this step 101, various processings or operations such as (a) an operation for enabling a vehicle speed interruption and a timer interruption which will be described later, (b) an operation for setting 1 a flag F (start) to "1" so as to start the execution of the next step 102, (c) an operation for setting the number 226 into a 8-bit timer counter $T_c$ (not indicated) which designated the time period of the timer interruption as 3 ms and having the stepping period of 100 μs, and (d) an operation for performing the reset of the flag F (AC).

The step 102 indicates the step for carring out the automatic cruise or AC control. In this step, after confirmation of the flag F (start) as being 1 the start of the operation is executed. In this case, (a) when shifting from the normal running condition to the automatic cruise running condition, the release valve 15 is turned ON, i.e. the operation for switching, the release valve 15 to the closed condition is carried out, and at the same time, the operation for setting the flag F (L/U) to binary "1" is performed subject to the actual car speed as being a predetermined speed, for instance, more that 60 km/h (37.3 mile/h), (b) the operation for calculating the duty ratio D of the control valve drive signal in the automatic cruise running condition and for calculating the ON period of the control valve drive signal in response to the duty D thus calculated, and (c) the operation for switching the release valve 15 to the OFF condition, i.e. the switching the valve 15 to the opened condition.

The step 103 indicates the step in which AT automatic transmission control, that is, the transmission control is carried out. In this step 103, the shift position is decided in accordance with a throttle opening signal from the throttle sensor 8, a range signal from the range switch 7, and a shift pattern and a lock-up pattern corresponding to the range information while the operation for determining whether or not the lock-up should be performed or the lock-up should be released.

The step 104 relates to the step for waiting the execution of the operation during the period after carrying out the transmission control in the step 103 up to the starting of the automatic cruise control, and this step 104 coresponds to the operation for confirming the flag F (start) as being "1" as in the step 102. In this case, the flag F (start) can be set to "1" by the timer interruption routine which will be described later, for instance, at the time period of 48 ms.

While executing the above main routine, the vehicle speed interruption routine and the timer interruption routine occur at the time of the leading edge of the car pulses from the speed sensor 9 and at the 3 ms time period, respectively.

Figure 3A:
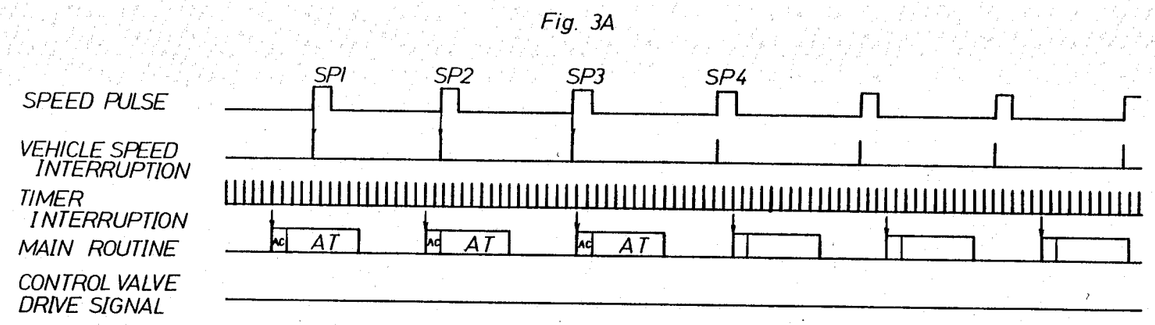
FIG. 3A and FIG. 3B illustrate respectively waveforms and timing chart for explaining the operations performed by the running control system in FIG. 1.

FIG. 3A shows a timing chart which indicates a relationship among speed pulses, the vehicles speed pulse interruption routine, the timer interruption routine, the main routine and the control valve drive signal during the normal running condition of the vehicle. As shown in the time chart, the vehicle speed interruption routine is started executing by the detection of the leading edge of the speed pulses while the main routine is executed every time the timer interruption routine occurring at the time period of 3 ms, namely it is executed at the time period of 48 ms. Moreover, in this normal running condition, as the control valve drive signal is maintained at low level it is not possible to adjust the throttle valve 11 from the throttle actuator 13 and the adjustment is only possible in response to the operation of the accelerator pedal.

Figure 3B:
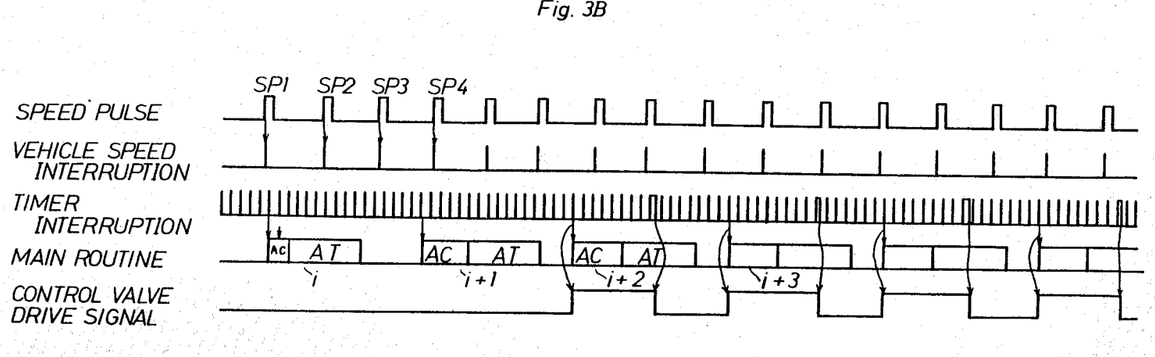

On the other hand, FIG. 3B shows a timing chart which indicates the relationship among the three different routines, the vehicle speed pulses, and the control valve drive signal when shifting from the normal running conditions described above to the automatic cruising by the operation of the set switch 5. When shifting to the automatic cruising in this case, the detected condition of switching from ON to OFF of the set switch 5 at the time of executing the i-th main routine after turning ON the key switch 4 causes the duty D to be calculated when executing the autodrive control step 102 of the next (i+1)th main routine and also causes the ON period of the control valve drive signal to be calculated. Thus, the control valve drive signal is reversed to high level by the timer interruption when the next (i+2)th main routine is started to execute and this high level condition is maintained during the above ON time period, hence returning the control valve drive signal to the low level again at the time of the completion of the ON period. In this case, the returning operation is executed in the timer interruption routine as in the switching ON operation of the control valve drive signal.

Then, the timing operation for producing the next control valve drive signal is performed in (i+2)th main routine.

In such an automatic cruise as described, the operation for producing the control valve drive signal is determined in accordance with the ON period calculated in the AC control step 102 in the main routine just before and the returning operation is executed by the timer interruption routine corresponding to the completion of the ON period.

The embodiment of the vehicle speed interruption routine and the timer interruption routine will now be described with reference to the flow charts in FIG. 4, FIG. 5 and FIG. 6.

Figure 4:
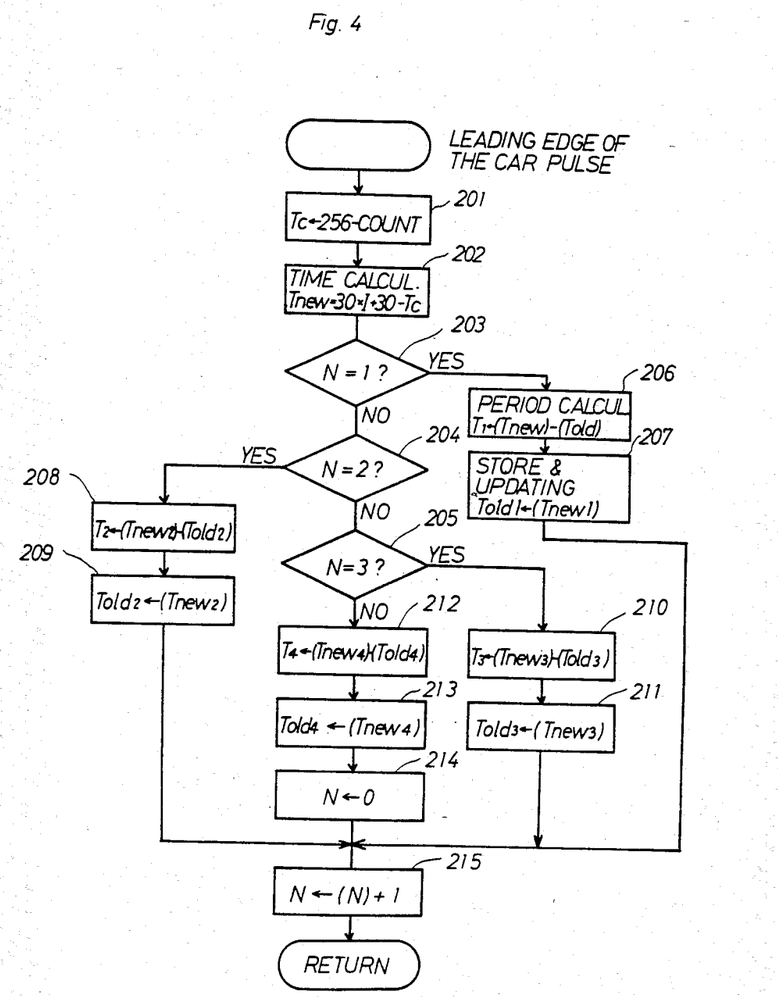
FIG. 4 is a interruption routine according to the present invention.

The vehicle speed interruption routine is shown in FIG. 4. In the FIG. 4, the step 201 indicates the step for reading the count in the timer counter and for calculating the valve of the timer $T_c$ by subtracting it from a present count "256". The step 202 indicates the step for placing the number of timer interruption I to a predetermined formula or equation, i.e. $(30 \times I + 30 - T_c)$ which will be explained later and for calculating the result, i.e. the current time $T_{new}$.

The step 203 indicates the step for determining the condition as to whether or not the execution of the interruption routine corresponds to the first speed pulse $SP_1$ from the content of the car speed flag N. That is, in this step 203, the decision making is made with respect to the start of the execution by detecting the leading edge of the first car speed pulse $SP_1$ of the interruption routine.

The step 204 indicates the step for deciding the condition whether or not the execution of the interruption routine corresponds to the second car speed pulse $SP_2$.

The step 205 indicates the step for deciding whether or not the execution of the interruption routine corresponds to the third speed pulse $SP_3$.

The step 206 indicates the step for calculating the time duration, i.e. the time period of $T_1$, the details of which will be described later, by subtracting from the current time $T_{new}$ calculated in the step 202 which corresponds to the speed pulse $SP_1$, i.e. the current time $T_{new\,1}$, the previous current time, i.e. the previous time $T_{old\,1}$.

The step 207 indicates the step for updating the previous time $T_{old\,1}$ stored by replacing it with the current time $T_{new\,1}$ in order to calculate the next time period.

The step 208 indicates the step for calculating the time period associated to other speed pulse $SP_2$ as in the step 206.

The step 209 indicates the step for updating the time associated with other speed pulse as in the step 207.

The steps 210 and 211 indicate respectively the step for calculating the period associated to the speed pulse $SP_3$ and updating the same.

The step 212 and 213 indicated respectively the step for calculating the period associated the speed pulse $SP_4$ and for updating the same.

The step 214 indicates the step for resetting the content of the flag N of the speed pulse number to "0".

The step 215 indicates the step for adding the content of the speed pulse number flag N by +1.

Figure 10:
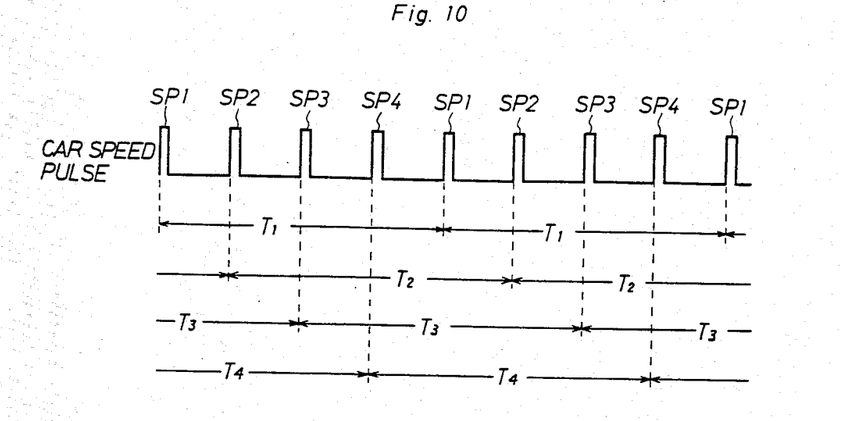
FIG. 10 is a timing chart for explaining each time period of T of the car speed pulses.

In this car speed interruption routine, every time the leading edge of the speed pulses is detected as shown in FIG. 4, the current time $T_{new}$ is calculated. Also, when the detected speed pulse corresponds to the first speed pulse $SP_1$, the time duration, i.e. the time period $T_1$ between the current $T_{new\,1}$ calculated in the vehicle speed interruption routine and the previous time $T_{old\,1}$ which is calculated in the vehicle speed interruption routine associated with the previous first speed pulse $SP_1$ is calculated, while the time periods $T_2$, $T_3$ and $T_4$ are also calculated similarly with respect to other second, third and fourth speed pulses $SP_2$, $SP_3$ and $SP_4$. The periods such as $T_1$, $T_2$, $T_3$ and $T_4$ are shown in FIG. 10.

These periods $T_1$, $T_2$, $T_3$ and $T_4$ thus calculated in the vehicle speed interruption routine are used as parameters for calculating the vehicle speed in the auto-drive control rountine as will be described later with reference to the FIG. 7.

The timer interruption routine will now be described with reference to FIG. 5.

Figure 5:
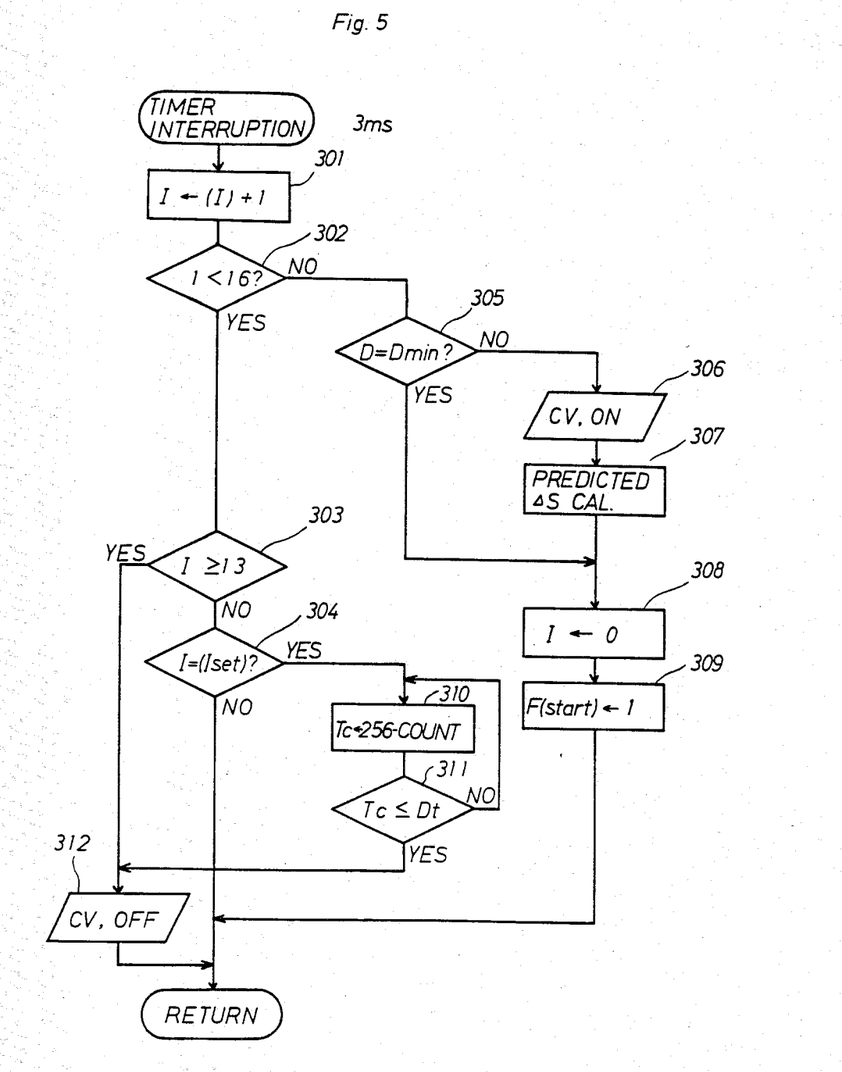
FIG. 5 is a timer interruption routine according to the present invention.

In the flow chart in FIG. 5, the step 301 indicates the step for performing the increment of the number of the timer interruption I by 1 every time the timer interruption occurs at the time period of 3 ms.

The step 302 indicates the step for determining whether or not the number of the timer interruption I is less than 16.

The step 303 indicates the step for determining whether or not the number of the timer interruption I is less than 13.

The step 304 indicates the step for determining whether or not the number of the timer interruption I is equal to the number of the set interruption $I_{set}$, that is, the number of the timer interruption to be set in the OFF timing operation which will be described later with reference to the FIG. 7.

The step 305 indicates the step for determining whether or not the duty D is equal to the minimum $D_{min}$.

The step 306 indicates the step for switching the drive signal to the control valve 14 to high level so as to operate the control valve 14.

The step 307 is the step for calculating $S_f$ in the following equation in order to calculate a predicated speed increment $\Delta S$, i.e. the duty D, $$D = D_o + Q[S_m - (S_n + S_f)] \ldots (1)$$

where, $D_o$ is initial duty, Q is control gain, $S_m$ is set speed, and $S_n$ is actual or current speed.

Moreover, the predicted speed increment S, i.e. $S_f$ is given by the following equation.

$$S_f = G \times P \tag{2}$$

$$= \frac{S_n - S_n - 1}{\Delta t} \times P$$

In the equation (2) above, G is acceleration, P is phase compensation amount, $S_{n-1}$ is current speed before 192 ms, i.e. previous speed, and $\Delta t$ is time difference of 192 ms.

The step 308 indicates the step for resetting the number of the time interruption I to "0".

The step 309 indicates the step for setting the start flag F to "1".

The step 310 indicates the step for reading the count in the timer counter and for subtracting it from 251 and then for calculating the timer valve $T_c$.

The step 311 is the step for determining whether or not the value of the timer is less than the remaining time $D_t$.

The step 312 indicates the step for switching the drive signal to low level so as to turn OFF the control valve 14.

In this timer interruption routine, as shown in FIG. 5, the duty D which will be described later is equal to the minimum duty $D_{min}$ during the normal running condition. As a result, the result of the decision in the step 305 is always becomes YES so that the control valve 14 is maintained OFF condition. Moreover, when the duty D is equal to the minimum duty $D_{min}$ during the auto-drive running condition, the control valve 14 is maintained OFF condition as in the case of the normal running condition.

Figure 11A:
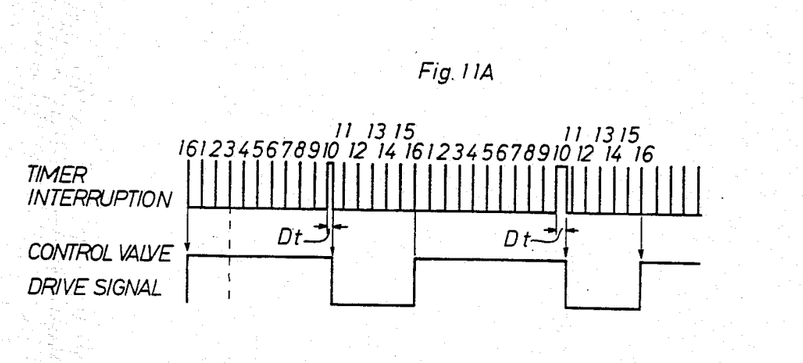
FIG. 11A and FIG. 11B illustrate respectively a timing chart for explaining the relationship between the timer interruption and the control valve drive signal.
Figure 11B:
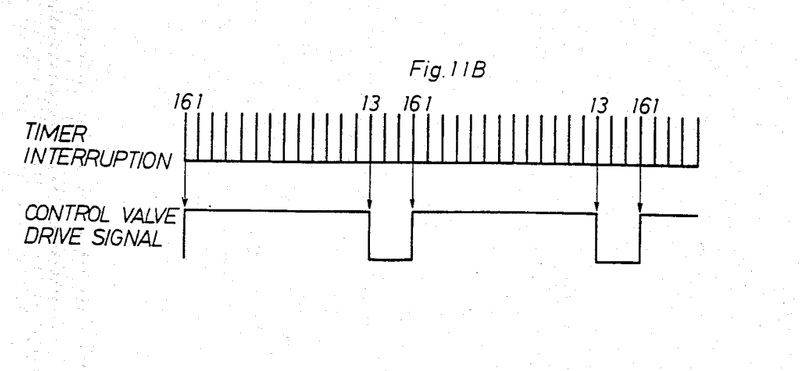

On the other hand, when the duty D is not equal to the minimum duty $D_{min}$ during the auto-drive running condition, the valve 14 is turned OFF at the period of 48 ms in the step 306, and then after the number of the timer interruption I reached the number of the set interruption $I_{set}$ and when the valve of the timer $T_c$ becomes less than the remaining time $D_t$, the operation for turning OFF the control valve 14 is performed. Accordingly, when the number of the set interruption $I_{set}$ is, for instance, 10, the control valve drive signal has the waveform as shown in FIG. 11A. However, when the number of the timer interruption I becomes more than 13 before the number of the timer interruption I coincides with the number of the set interruption $I_{set}$, the reaching of the number of the timer interruption to 13 allows the control valve 14 to be turned OFF at the same time. Accordingly, the waveform of the control valve drive signal becomes the one as shown in FIG. 11B.

Furthermore, if the duty D does not coincide with the minimum duty $D_{min}$, the predicted car speed increment $\Delta S$ calculation is performed at the period of 48 ms.

Figure 6:
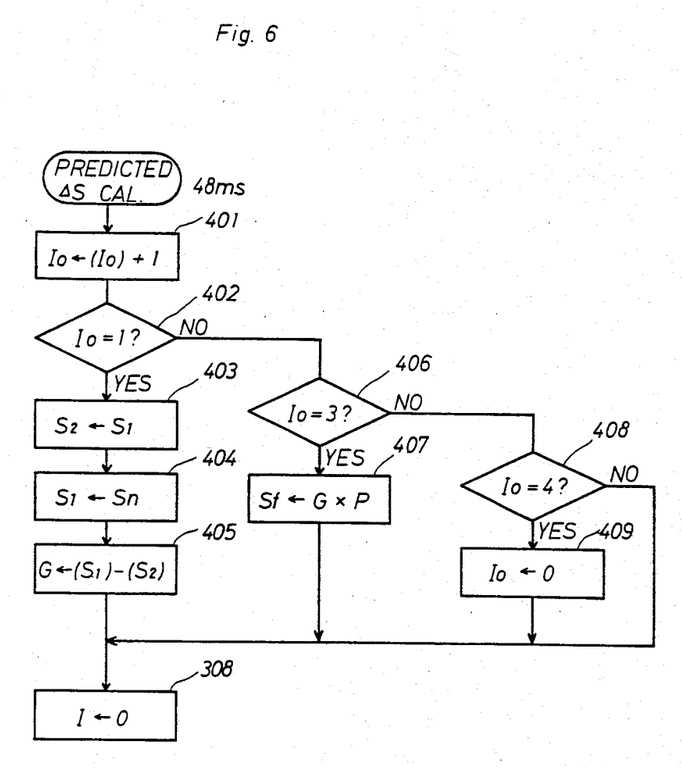
FIG. 6 is a predicted ΔS calculation or operation routine in the timer interruption routine according to the present invention.

FIG. 6 is a flow chart of one embodiment according to the present invention, which carries out the predicted car speed increment $\Delta S$ calculation.

In the FIG. 6, the step 401 indicates the step for performing the increment of the number of the predicted car speed increment $\Delta S$ operation $I_o$ by +1.

The step 402 indicates the step for determining whether or not the number of the predicted car speed increment S calculation is "1".

The step 403 indicates the step for equalizing the previous car speed $S_{n-1}$ to the second calculated car speed $S_2$.

The step 404 indicates the step for equalizing the current speed $S_n$ to the first calculated speed $S_1$.

The step 405 indicates the step for subtracting the second calculated speed $S_2$ from the first calculated speed $S_1$ and for producing the acceleration G in the equation (2).

The step 406 indicates the step for determining whether or not the number of the predicted car speed increment $\Delta S$ calculation is equal to "3".

The step 407 indicates the step for multiplying the phase compensation amount P by the acceleration G which was calculated in the step 405 above and for producing the predicted speed increment $S_f$.

The 408 indicates the step for determining whether or not the number of the predicted speed increment $\Delta S$ calculation $I_o$ is equal to "4".

The step 409 indicates the step for setting the number of the predicted speed increment $\Delta S$ calculation $I_o$ to "0". In this predicted speed increment $\Delta S$ operation routine, the predicted speed increment $S_f$ is calculated at the period of 192 ms as shown FIG. 6.

In this case, the predicted speed increment $S_f$ thus calculated is used as a parameter for calculating the duty D in FIG. 7 the detail of which will be described later.

Figure 7:
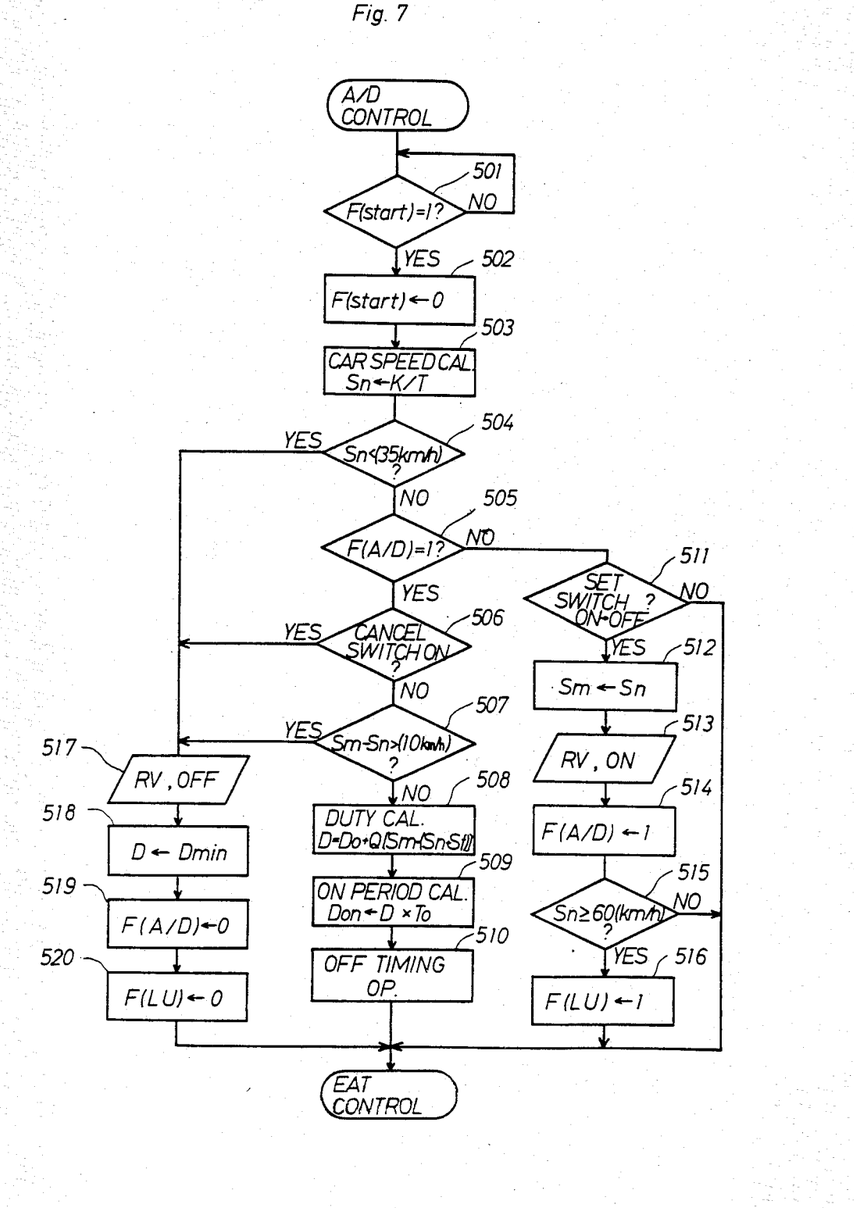
FIG. 7 is an auto-drive control routine according to the present invention.

FIG. 7 is a flow chart for performing the AC control routine shown in FIG. 2 according to one embodiment of the present invention. In FIG. 7, the step 501 indicates the step for determining whether or not the flag F (start) is equal to "1".

The step 502 indicates the step for resetting the flag F (start) to "0".

The step 503 indicates the step for performing the vehicle speed calculation. Namely, in this step 503, the constant K is divided by the time period T calculated in the vehicle speed interruption routine described above and for producing the current car speed $S_n$.

The step 504 indicates the step for determining whether or not the current vehicle speed $S_n$ is less than 35 km/h (21.8 mile/h).

The step 505 indicates the step for determining whether or not the flag F (AC) is equal to "1".

The step 506 indicates the step for determining whether or not the cancel switch 6 has been turned ON.

The step 507 indicates the step for determining whether or not the speed difference between the set speed $S_m$ and the current speed $S_n$ is above 10 km/h (6.2 mile/h).

The step 508 indicates the step for carrying out duty operation, i.e. in this step 508 the duty D is produced by the calculation of the above equation (1).

The step 509 indicates the step for multiplying the period $T_o$, i.e. 48 ms by the duty D thus calculated in the step 508, and for calculating the ON period $D_{on}$ of the control valve drive signal. In this case, the period $T_o$ is given by the value "480" so as to be the unit time of 100 μs.

Figure 8:
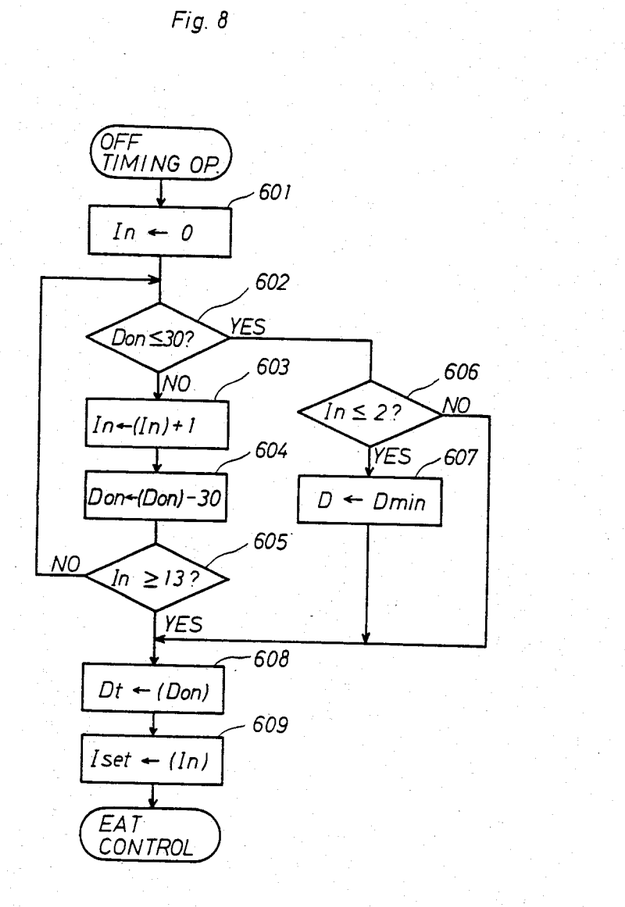
FIG. 8 is an OFF-timing operation routine in the autodrive routine according to the present invention.

The step 510 indicates the step for performing the OFF timing operation. Namely, in this step 510 as shown in FIG. 8, the number of set interruption $I_{set}$ and the remaining time or residue time $D_t$ are calculated in accordance with the ON period $D_{on}$ which was produced in the stpe 509.

The step 511 indicates the step for determining whether or not the set switch 5 has been switched from ON to OFF.

The step 512 indicates the step for equalizing the current speed $S_n$ to the set speed $S_m$.

The step 513 indicates the step for producing the output so as to operate or to turn ON the release valve 15.

The step 514 indicates the step for setting the flag F (AC) to "1".

The step 515 indicates the step for determining whether or not the current speed $S_n$ is above 60 km/h (37.3 mile/h)

The step 516 indicates the step for setting the lock-up flag F (L/U) to "1".

The step 517 indicates the step for producing the output so as to turn OFF the release valve.

The step 518 indicates the step for equalizing the duty D to the minimum duty $D_{min}$.

The step 519 indicates the step for restting the flag F (AC) to "0".

The step 520 indicates the step for resetting the flag F (L/U).

In this AC control routine, the current speed $S_n$ is operated at the time period of 48 ms. However, during the normal running condition, when the current speed $S_n$ is less than the 35 km/h (21.8 mile/h) after executing the steps 504, 517, 518, 519 and 520, the control is now shifted to the subsequent AT control. On the other hand, however, when the current speed $S_n$ is more than 35 km/h (21.8 mile/h) the subsequent AT control is executed after executing the step 503, through the steps 504, 505 and 511.

Moreover, when shifting from the normal running condition to the automatic cruising by the operation of the set switch 5, the current speed $S_n$ is set to the set speed $S_m$ in the step 512 so as to reverse the result of the decision in the step 511 to YES and the release valve 15 is turned ON in the step 513, and then the flag F (AC) is set to "1" in the step 514.

In this case, if the current speed $S_n$ is more than 60 km/h (37.3 mile/h) the flag F(L/U) is set to "1" and now the control is shifted to the AT control. In this case, when the current speed is less than 60 km/h (37.3 mile/h) the AT control is executed without setting the lock-up flag F (L/U).

During the auto-drive running condition, since the autodrive flag F (L/U) is maintained set condition, the result of the decision becomes YES and the duty D is calculated in the step 508, thus calculating the ON period $D_{on}$ of the control valve drive signal in accordance with the duty D thus calculated in the step 509. Then the number of the set interruption $I_{set}$ and the residue time $D_t$ are calculated in accordance with the ON period $D_{on}$ in the step 510.

Afterward, if the cancel switch 6 is turned ON or the current speed $S_n$ is reduced after exceeding 10 km/h (6.2 mile/h) from the set speed $S_m$, the operations described above, such as the duty calculation, ON period calculation, and OFF timing operation are no longer executed and the operation for turning OFF the release valve 15 is executed in the step 517 instead. Afterward, the operation for compulsorily replacing the duty D with the minimum duty $D_{min}$ in the step 518, the operation for resetting the flag F (AC) to "0" in the step 519, and the operation for resetting the flag F (L/U) in the step 520 are successively executed and the automatic cruising is released.

FIG. 8 shows a flow chart for performing the OFF timing operation in the auto-drive control routine described above. In FIG. 8, the step 601 indicates the step for resetting the number of the virtual timer interruption $I_n$.

The step 602 indicates the step for determining whether the ON period $D_{on}$ calculated in the step 509 is less than 30, i.e. 3 ms.

The step 603 indicates the step for performing the increment of the number of the virtual timer interruption $I_n$ described above by +1.

The step 604 indicates the step for subtracting 30, i.e. 3 ms from ON period $D_{on}$ and for producing the ON period after updating.

The step 605 indicates the step for determining whether or not he number of the virtual timer interruption $I_n$ is more than 13.

The step 606 indicates the step for determining whether or not the number of the virtual timer interruption $I_n$ is less than 2.

The step 607 indicates the step for compulsorily replacing the duty D with the minimum duty $D_{min}$.

The step 608 indicates the step for setting the ON period after the final updating to the residue time $D_t$.

The step 609 indicates the step for setting the virtual timer interruption number $I_n$ to the set interruption number I set after the final updating.

In such a OFF timing operation routine as described above, when the ON period $D_{on}$ is less than "90", i.e. 9 ms, the duty D is replaced with the minimum duty $D_{min}$. For this reason, as the result of the decision in the step 305 in the timer interruption routine described above with reference to FIG. 5 becomes YES, the step 306 is no longer executed and the control valve 14 can not be turned ON.

On the other hand, when the ON period $D_{on}$ is above 9 ms, the closed loop consisting of the steps 602, 603, 604 and 605 is repeatedly executed untill the $O_n$ time $D_{on}$ after updating becomes less than 3 ms and the number of the virtual timer interruption $I_n$ is incremented while the ON time period $D_{on}$ is reduced every 3 ms. In this case, when the $O_n$ period $D_{on}$ after updating becomes less than 3 ms, the result of the decision in the step 602 is reversed to YES and the ON period $D_{on}$ after the final updaing is set as the residue time $D_t$ while the number of the virtual timer interruption $I_n$ is set as the number of the set interruption $I_{set}$. These residue time $D_t$ and the number of the set interruption $I_{set}$ are used for the timing designation for turning OFF the control valve 14 in the timer interrption routine as described above.

However, when the ON period $D_{on}$ is more than 39 ms, the number 13 is uniformly given as the set interruption number $I_{set}$. Accordingly, the condition where the actual ON period exceeds 39 ms, is inhibited.

Figure 9:
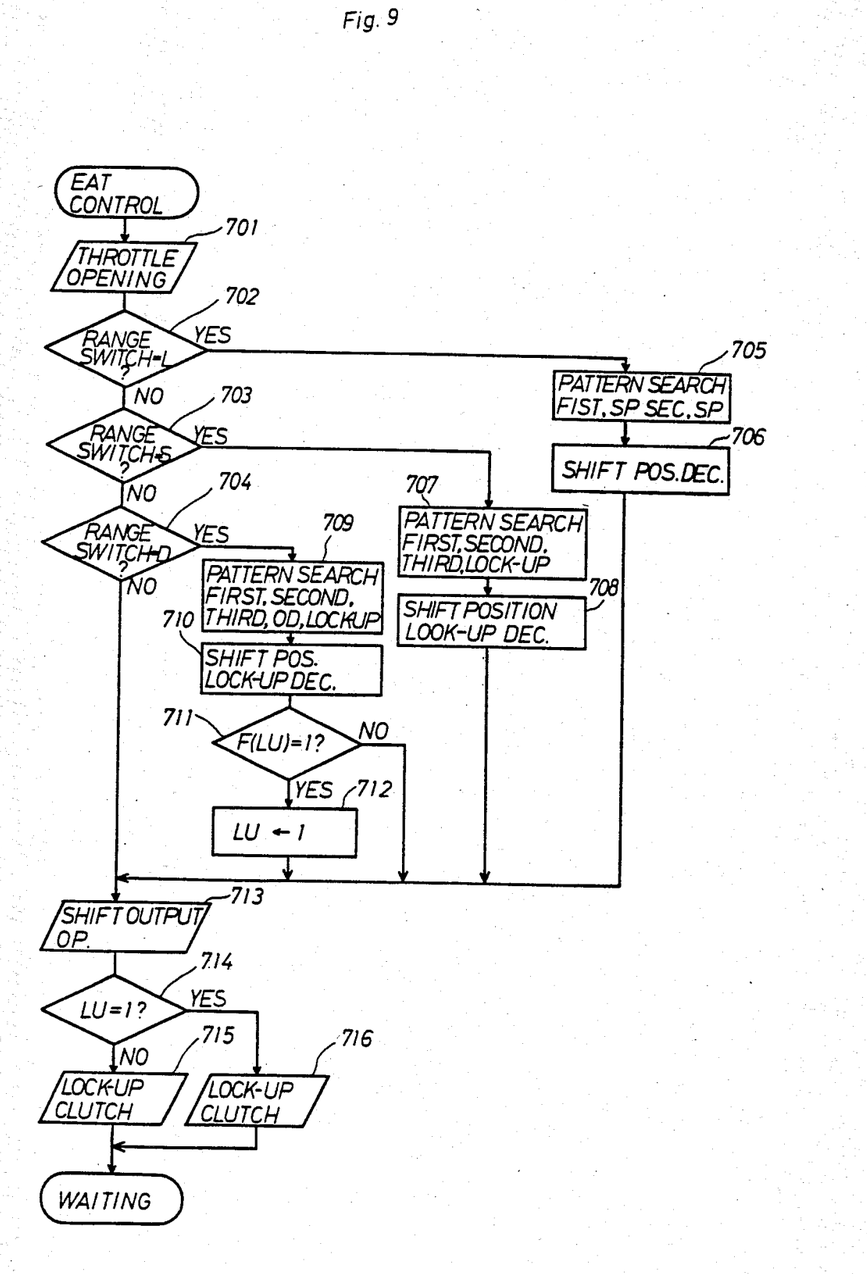
FIG. 9 is a flow chart of a speed control routine of according to the present invention.

FIG. 9 is a flow chart for performing the AT control, i.e. the speed change control shown in FIG. 2 according to the one embodiment of the present invention. In the FIG. 9, the step 701 indicates the step for picking up a throttle opening signal from the throttle sensor 8.

The step 702 indicates the step for determining whether or not the range switch 7 has been set in the range position L.

The step 703 indicates the step for determining whether or not the range switch 7 has been set in the range position S.

The step 704 indicates the step for determining whether or not the range switch 7 has been set in the range position D.

The step 705 indicates the step for searching the L range shift pattern for shifting down from the second speed to the first speed. Namely, the shift reference speed data are read in accordance with the throttle opening corresponding to the input signal from the throttle sensor 8.

The step 706 indicates the step for determining whether or not the current shift position should be maintained or should be shifted down to the first speed from the second speed in accordance with the number of the rotations of the output shaft, which corresponds to the input signal from the speed sensor 9 and the shift reference speed data which were searched in the step 705.

Figure 12A:
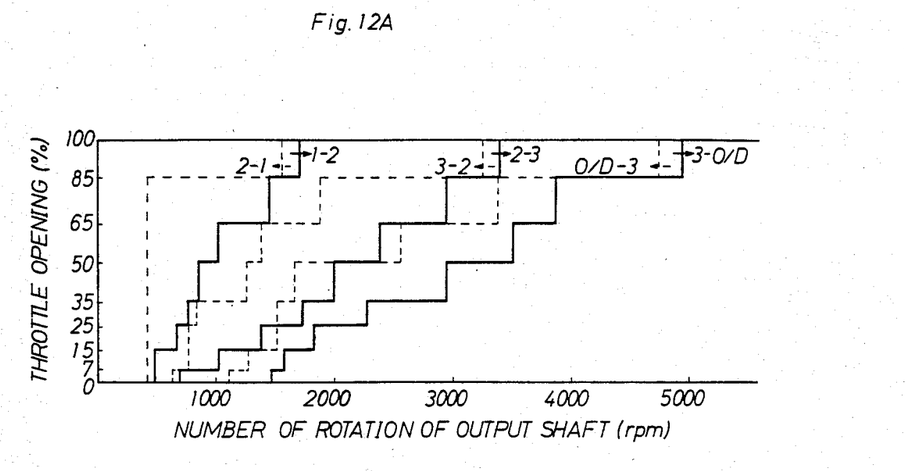
FIGS. 12A and 12B illustrate respectively a shift pattern showing the relationship between the throttle opening and the number of rotation of the output shaft.
Figure 12B:
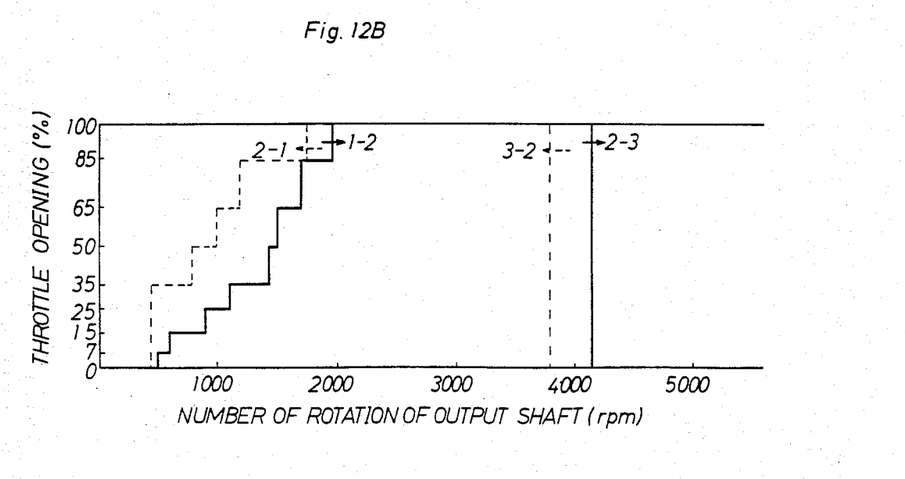
Figure 13A:
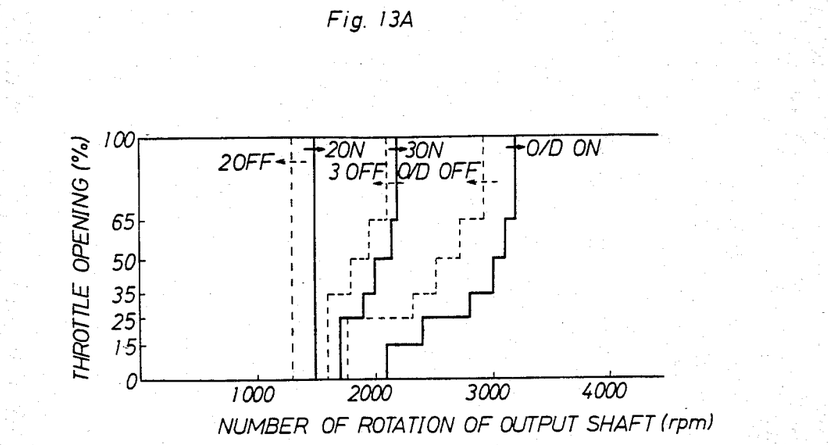
FIGS. 13A and 13B illustrate respectively a lock-up pattern showing the relationship between the throttle opening and the number of rotation of the output shaft.
Figure 13B:
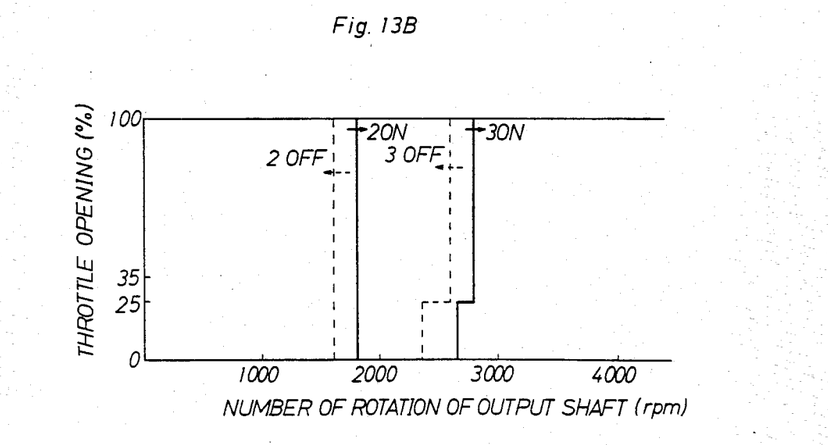

The step 707 indicates the step for searching the S range lock-up pattern as shown in FIG. 13B as well as the S range shift pattern as shown in FIG. 12B in response to the throttle opening.

The step 708 indicates the step for deciding the shift position in accordance with the shift reference speed data which were searched in the step 707 described above and the lock-up reference speed as well as as the number of rotation of the output shaft and also for deciding whether or not the lock-up should be released.

In the shift pattern shown in FIG. 12B in this case, the step 1-2 depicted in the solid lines indicate the up-shift position which decides the shifting up from the first speed to the second speed, while the steps 2-3 depicted in the solid lines indicate the up-shift position which decides the shifting up from the second speed to the third speed. The steps 2-1 and 3-2 depicted both in the dotted lines indicate the down-shift positions respectively which decide the shift-down from the second speed to the first speed and from the third speed to the second speed shift down. In the lock-up pattern shown in FIG. 13B, the solid line 20N indicates the lock-up ON position for operating the lock-up clutch 20 during the running at the second speed of the vehicle.

The solid line 30N indicates similarly the lock-up ON position for operating the lock-up clutch 20 during the third speed running of the car, while the dotted lines indicated by 2 OFF and 3 OFF indicate respectively the lock-up OFF positions for releasing the lock-up clutch 20 during the second speed and the third speed runnings.

The step 709 indicates the step for searching the D range lock-up pattern as shown in FIG. 13A and the D range shift pattern as shown in FIG. 12A in accordance with the throttle opening.

The step 710 indicates the step for deciding the shift position in accordance with the shift reference speed data which were searched in the step 700 and the lock-up reference speed data searched in the same step as well as the number of the rotation of the output shaft and also for deciding whether or not the lock-up should be performed or the lock-up should be released. The steps depicted in the solid lines and in the dotted lines in the shift pattern shown in FIG. 12A which are designated by the reference numerals 1-2, 2-3, 2-1 and 3-2 are similar to those depicted in the patterns shown in FIG. 12B.

In the same figure, the other reference numerals such as 3-OD and OD-3 indicate the shift-up from the third speed to the overdrive area and the shift-down from the overdrive area to the third speed.

Also the stepping shapes and the reference numerals attached thereto in the patterns shown in FIG. 13A are similar to those shown in FIG. 13B and the other numerals O/D ON and O/D OFF indicate the meaning for producing the lock-up and for releasing the lock-up respectively.

The step 711 indicates the step for determining whether or not the flag F is equal to "1".

The step 712 indicates the step for setting the flag to "1", which determines whether or not the lock-up output should be allowed.

The step 713 indicates the step for performing the shift out operation according to the shift position which was decided in the steps 706, 708 and 710. The shift output operations are performed in accordance with the table 1 as follows;

TABLE I

| RANGE | SOLENOID NO. | SHIFT FIRST SPEED | SECOND SPEED | THIRD SPEED | OVERDRIVE |
|---|---|---|---|---|---|
| D | FIRST SHIFT SOLENOID 22 ($S_1$) | ON | ON | OFF | OFF |
|   | SECOND SHIFT SOLENOID 23 ($S_2$) | OFF | ON | ON | OFF |
| S | $S_1$ | ON | ON | OFF | |
|   | $S_2$ | OFF | ON | — | |
| L | $S_1$ | — | — | | |
|   | $S_2$ | OFF | ON | | |

The step 714 indicates the step for deciding whether or not the flag L/U is equal to "1".

The step 715 indicates the step for turning OFF the lock-up clutch 20.

The step 716 indicates the step for truning OFF the lock-up clutch 20.

In this AT control routine, as shown in FIG. 9, the shift out-put operation is performed and the gear postion is selected in the step 713 while the decision making is done whether or not the lock-up clutch 20 should be turned ON or OFF in accordance with the content of the flag (L/U) and the output shaft 19 of the torque converter should be derectly coupled to the input shaft 18 of the torque converter 17 or the input and the output shafts should be coupled through the converter 17. Accordingly, when the autodrive running is instructed, and if the car speed is more than 60 km/h, the lock-up clutch 20 is maintained ON condition as the flag L/U is maintained set condition and the input shaft 18 of the torque converter and the output shaft 19 of the torque converter are maintained in the directly coupled condition.

As described in the foregoing, in the running control device according to the present invention, which comprises the input portion and the output portion including the lock-up clutch so as to enable the auto-drive running, the running control operation consisting of the auto-drive control and the speed change control is performed periodically and the output portion is thus controlled, while when the car speed is more than a predetermined level and the autodrive running is instructed, the lock-up clutch is compulsorily locked up and the locked up condition can be maintained.

With this construction, since the locked up condition is maintained in the auto-drive running condition, the power transmission efficiency as well as the fuel cost can be improved. Moreover, as the autodrive control can be performed in the lock-up condition, effective improvement in the response and a highly accurate car speed control can be realized as well as a sufficient and preferable engine brake can be obtained, for instance, at the descending slope.

In the embodiment described in the foregoing according to the present invention, it is constructed in such a manner that the locked up condition is fixedly maintained, but it is apparent that it can be also released temporarily at the time of the shift-up or the shift-down.

Moreover, in the embodiment in the foregoing, the running control can be performed in accordance with a predetermined period. However, it is also possible to shift to the auto-drive control continuously from the speed change control while monitoring the progression of the operation.

In the foregoing, some embodiments according to the present invention have been described with reference to the attached drawings, but it is apparent that various changes and modification thereof are possible by replacing an element or elements with other equivalent element or elements which will produce same effects without departing the spirit of the present invention and the appended claims.

What is claimed is:

1. An automatic running control method for a vehicle which comprises:
   a prime mover for generating a revolving driving force,
   a throttle controlling means for controlling said revolving driving force according to a first controlling signal,
   a transmission means including a torque converter and a transmission which delivers said revolving driving force of said prime mover to a wheel,
   a lock-up clutch for alternatively connecting and interrupting an input and an output shaft of said torque converter according to a second controlling signal,
   a transmission ratio adjusting means for determining a transmission ratio of said transmission according to a third controlling signal,
   an indicating means for generating a start signal and an end signal indicating respectively the start and end of an automatic cruising mode,
   said method comprising the steps of:
   converting the actual running speed of the vehicle to a speed signal;
   converting the actual running load of the vehicle to a load signal;
   generating a mode signal, indicative of operation of said automatic cruising mode, whenever said start signal is generated and the value of said speed signal is greater than a predetermined value set by a first standard signal, and ceasing generation of said mode signal whenever said end signal is generated;
   holding said speed signal as a reference signal during generation of said mode signal;
   adjusting said throttle controlling means by generating said first controlling signal so as to minimize the difference between said speed signal and said reference signal;
   adjusting said transmission ratio adjusting means by generating said third controlling signal to adjust said transmission ratio in accordance with a predetermined relationship with said speed signal and said load signal;
   controlling the generation of said second controlling signal to control said lock-up clutch in accordance with a predetermined relationship with said speed signal and said load signal; and
   overriding previous control of said second controlling signal so as to cause connecting of said lock-up clutch during generation of said mode signal.

2. An automatic running control method for a vehicle as in claim 1, wherein:
   said overriding step controls generation of said second controlling signal to connect said lock-up clutch during generation of said mode signal and when the value of said speed signal is larger than a predetermined second standard signal, said second standard signal having a value greater than that of said first standard signal.

3. An automatic control method for a vehicle as in claim 2, wherein:
   said actual running load is derived in part from the position of said throttle controlling means, said position being converted into said load signal.

* * * * *